B. C. SEATON.
VEHICLE BODY SUPPORT.
APPLICATION FILED APR. 15, 1916. RENEWED DEC. 5, 1917.
1,275,097.
Patented Aug. 6, 1918.
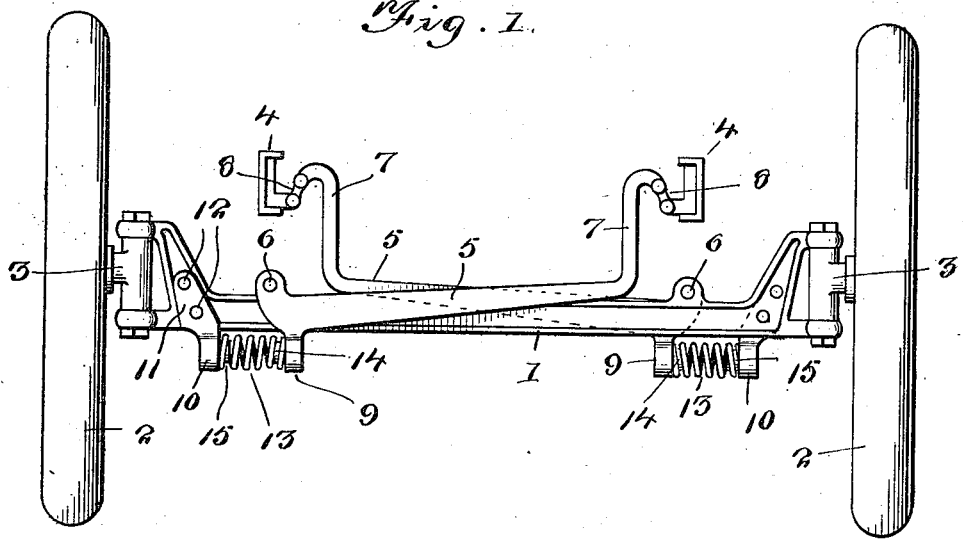
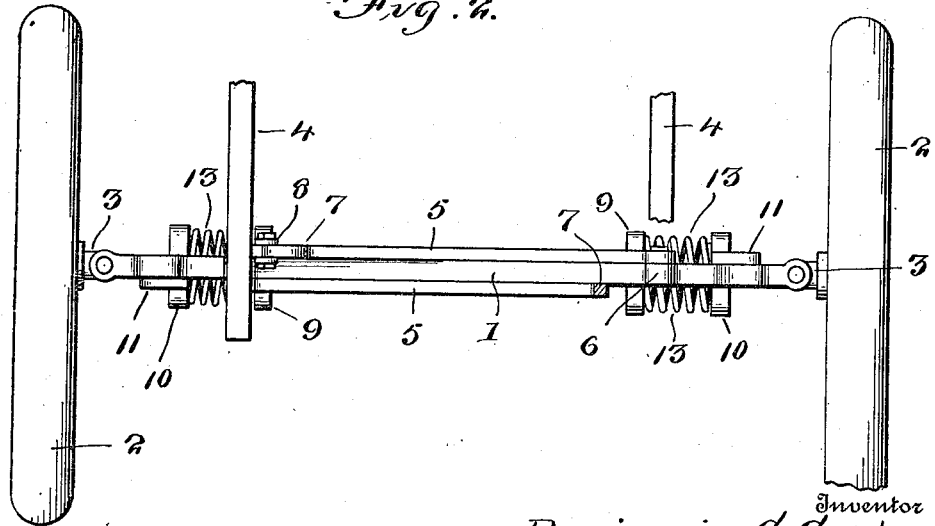
Inventor
Benjamin C. Seaton
Witnesses
By Victor J. Evans
Attorney

UNITED STATES PATENT OFFICE.

BENJAMIN C. SEATON, OF NASHVILLE, TENNESSEE.

VEHICLE-BODY SUPPORT.

1,275,097.  Specification of Letters Patent.  Patented Aug. 6, 1918.

Application filed April 15, 1916, Serial No. 91,365. Renewed December 5, 1917. Serial No. 205,665.

*To all whom it may concern:*

Be it known that I, BENJAMIN C. SEATON, a citizen of the United States, residing at Nashville, in the county of Davidson and State of Tennessee, have invented new and useful Improvements in Vehicle-Body Supports, of which the following is a specification.

This invention relates to vehicle body supports, the object in view being to provide resilient body supporting means the construction of which will enable the ordinary elliptical or partial elliptical springs now interposed between the axle and the body to be eliminated, the construction hereinafter particularly described providing for the independent movement of the wheels in relation to the body, whereby a wheel upon meeting an obstruction or dropping into a depression in the road bed will not affect the other wheels and will also have little or no effect upon the body of the vehicle.

A further object in view is to so arrange the body supporting mechanism of this invention that the tendency to twist the body of the vehicle will be practically eliminated thus increasing the life and durability of the body of the machine as well as the running gear and all parts of the machine. Additionally, the cost of the production and the expense of maintenance of the machine will be materially reduced.

With the above and other objects in view, the invention consists in the novel construction, combination and arrangement of parts, as herein described, illustrated and claimed.

In the accompanying drawings:—

Figure 1 is a front elevation of a sufficient portion of a motor vehicle to illustrate the present invention in its applied relation thereto.

Fig. 2 is a plan view of the same.

Referring to the drawings 1 designates one of the axles of the vehicle, it being understood that the invention hereinafter described is applied to both the front and rear axles of the machine which are held at a certain distance from each other by the usual connections (not shown). In the drawings, the invention is illustrated only in connection with the front axle of the machine, 2 designating the steering wheels, 3 the steering knuckles and 4 the side frame bars upon which the body of the machine is ordinarily mounted and supported.

In carrying out the present invention, I employ in connection with each axle a pair of body supporting members 5 each of which is shown in the form of a lever. These levers are pivotally connected at the points 6 to the axle 1 and extend transversely of the machine. Each lever is provided at the free end thereof with an upstanding body elevating portion or arm 7 which is connected by a link 8 to the adjacent frame bar 4.

It will be noted that each lever has a jointed connection at one end with one of the frame bars 4 while the pivot point 6 of the same lever is located about in line with the opposite side of the body. Thus the lever which is pivotally connected to the axle at one side of the machine supports the opposite side of the body or frame at the other side of the machine.

Each of the levers or body supporting members 5 is provided with a cushion compressing arm 9 and at a point in spaced relation thereto there is an abutment 10 bearing a fixed relation to the axle 1, the abutment 10 being shown as formed with an attaching portion 11 which is fastened to the axle at 12. Between the compressing arm 9 and the abutment 10 there is interposed one or more cushions 13 each of which is shown in the form of a coiled spring the opposite extremities of which are held in place by studs 14 and 15 projecting toward each other from the arm 9 and the abutment 10, respectively. In Fig. 2 of the drawings two of said cushions 13 are illustrated, arranged at opposite sides of the vertical center of the axle 1. The drawings also illustrate the levers 5 as being located at opposite sides of the axle which arrangement is not, however, essential and may therefore be varied in accordance with the scope of the appended claims. It will be understood that the construction illustrated in Figs. 1 and 2 is used in connection with both the front and rear axles of the vehicle so that in a complete vehicle four of the body supporting members or levers 5 are employed.

In view of the foregoing description, taken in connection with the accompanying drawings, it will now be understood that each of the levers 5 together with its cushion 13 is operable independently of the other levers in connection with their cushions. Therefore, when a wheel drops into a depression or rides over an obstruction, it has no effect upon the remaining wheels and little or no effect upon the body of the vehicle which is yieldingly supported at four points, by resilient means having no direct connection between the axle and the body or body supporting frame of the machine. This does away with any twisting action of the vehicle body, materially reduces the shocks and strains on the machine as a whole, results in greater tire mileage and adds greatly to the comfort of the occupants of the vehicle owing to the easy running and smooth gliding properties of the machine.

I claim:—

1. The combination with the frame and axle of a vehicle, of body-supporting levers extending transversely under the vehicle frame each having a jointed connection at one end with the frame at one side of the latter and pivotally supported at its other end by the axle at the opposite side of the frame, and compressible cushioning means for said levers, each of said levers having adjacent to its point of attachment to the axle a compression arm which coöperates with the respective cushion.

2. The combination with the frame and axle of a vehicle, of body-supporting levers extending transversely under the vehicle frame each having a jointed connection at one end with the frame at one side of the latter and pivotally supported at its other end by the axle at the opposite side of the frame, each of said levers having adjacent to its point of attachment to the axle a cushion compressing arm, a cushion abutment for each lever fast on the axle between said compressing arm and the adjacent wheel, and a compressible cushion for each lever interposed between the compressing arm thereof and the respective abutment.

3. The combination with the frame and axle of a vehicle, of body-supporting levers extending transversely under the vehicle frame each having a jointed connection at one end with the frame at one side of the latter and pivotally supported at its other end by the axle at the opposite side of the frame, and independent compressible cushions for said levers, each of said levers having adjacent to its point of attachment to the axle a compression arm which coöperates with the respective cushion and each of said levers acting independently of the other.

4. The combination with the frame and axle of a vehicle, of body-supporting levers extending transversely under the vehicle frame each having a jointed connection at one end with the frame at one side of the latter and pivotally supported at its other end by the axle at the opposite side of the frame, each of said levers having adjacent to its point of attachment to the axle a cushion compressing arm, a cushion abutment for each lever fast on the axle between said compressing arm and the adjacent wheel, and a compression spring for each lever interposed between the compressing arm thereof and the respective abutment.

In testimony whereof I affix my signature.

BENJAMIN C. SEATON.

Copies of this patent may be obtained for five cents each, by addressing the "Commissioner of Patents, Washington, D. C."